United States Patent [19]

Coulter et al.

[11] Patent Number: 4,858,462

[45] Date of Patent: Aug. 22, 1989

[54] ACOUSTIC EMISSION LEAK SOURCE LOCATION

[75] Inventors: John E. Coulter; Robert S. Evans, both of Lynchburg; Michael O. Robertson, Hurt, all of Va.

[73] Assignee: The Babcock & Wilcox Company, New Orleans, La.

[21] Appl. No.: 300,408

[22] Filed: Jan. 20, 1989

[51] Int. Cl.$^4$ ............................................. G01M 3/24
[52] U.S. Cl. ..................... 73/40.5 A; 73/592
[58] Field of Search ............... 73/40.5 A, 592, 587

[56] References Cited

U.S. PATENT DOCUMENTS 4,785,659  11/1988  Rose et al. ................. 73/40.5 A

FOREIGN PATENT DOCUMENTS

| 152415 | 11/1981 | Fed. Rep. of Germany ... 73/40.5 A |
| 136416 | 10/1979 | Japan ............................... 73/40.5 A |
| 87022 | 7/1980 | Japan ............................... 73/40.5 A |
| 67439 | 4/1984 | Japan ............................... 73/40.5 A |
| 43534 | 2/1987 | Japan ............................... 73/587 |
| 1368685 | 1/1988 | U.S.S.R. ........................... 73/587 |

Primary Examiner—Tom Noland
Assistant Examiner—Joseph W. Roskos
Attorney, Agent, or Firm—Vytas R. Matas; Robert J. Edwards; Daniel S. Kalka

[57] ABSTRACT

A method and apparatus for locating a leak which produces a continuous acoustic emission having background noise and spikes, comprises continuously monitoring the acoustic emissions using spaced apart detectors which produce signals having background noise and spikes corresponding to those of the continuous acoustic emissions. The spikes of one signal are offset in time with respect to the spikes of the other signal, which corresponds to the difference in travel time of the acoustic signals to each of the detectors. By measuring the offset between the spikes, the relative position of the acoustic emission, and thus the relative position of the leak, can be determined with respect to the position of the detectors. To facilitate separating the spikes from the background noise, a floating detection threshold value is applied to the signals for eliminating the background noise.

5 Claims, 2 Drawing Sheets

ACOUSTIC EMISSION LEAK SOURCE LOCATION

FIELD AND BACKGROUND OF THE INVENTION

The present invention relates in general to the field of acoustic emission detection, and in particular, to a new and useful method and apparatus for locating a fluid leakage.

In the past, acoustic emission was used to detect and locate leaks in pressure systems through zonal location techniques, based upon relative signal amplitudes derived from various piezoelectric transducers near the source. Typically, there exist two types of acoustic emissions: burst and continuous. Burst type emission is characterized by acoustic emission signals being generated at a rate slow enough to allow for differentiation between individual events. Acoustic emission source location systems are designed for this type of acoustic emission.

With continuous type emission, the signals become overlapped to the extent that differentiation between the individual events is sometimes impossible. For this reason, it has been believed that when dealing with acoustic emission leak monitoring, one should only concern oneself with steady state parameters such as RMS voltages, because source locations derived from pressure leakages are virtually impossible.

U.S. Pat. No. 4,457,163 to Jäckle describes a method and an instrument for precise location of defects in a pipeline by acoustic emissions. The apparatus employs a memory for measurement values, with a frequency analysis and an octave filter. The noise peak of each measurement point as detected by the amplifier is transmitted to digital memory for measurement values which displays a histogram of the noise distribution along the measurement distance along the pipe. In a second process phase, the main and preferred frequency of the loudest measurement point is determined on a broad band and an octave filter is used to determine the characteristic frequency of the emitted medium from the main and preferred frequency as determined on a broad band for the purpose of precise location.

U.S. Pat. No. 4,428,236 to Votava et al describes a method of acoustic emission testing of pipelines for nuclear reactor installations. This reference teaches that the location of a defect can be detected with the aid of the so called triangulation method which is similar to the localization of the center of an earthquake in seismology. In pipelines, a linear orientation or position finding of the defect by measuring the transmission time difference between two test probes is generally sufficient. The method includes subjecting the work piece to a pressure medium such as water and to ultrasonic pulses emitted during deformation development resulting from growth of cracks or from leaks and transmitted through the work piece. These pulses are detected and amplified with equipment formed from these test probes. The test probes are disposed so as to determine respective sources of acoustic emission due to differences in transmission time of the ultrasonic pulses through the component and electronic amplifiers operatively associated with the test probes. The resultant amplified defect signal is then displayed.

*Industrial Heating* magazine the May issue, 1986, on page 52, discloses that in an acoustic emission signal, the location timing is relative to the time of arrival at the sensors. The time it takes acoustic emission waves to travel to two sensors is used to determine the location of the flaw in the tube.

U.S. Pat. No. 4,609,994 to Bassim et al. discloses an apparatus for continuous long term monitoring of acoustic emission. The apparatus includes a plurality of detector-analyzer units coupled to a central control unit via a communications link. Each detector-analyzer unit includes an acoustic detector, signal processing means, and a microprocessor. The signal processing means may have at least one signal conditioner and one measuring circuit which provides digital output signals representing a set of emission parameters. The microprocessor includes a threshold adjustment means which characterizes incoming data signals as either acoustic emission signals or background noise.

Other techniques which utilize acoustic emissions to determine the presence of leaks or other defects can be found in U.S. Pat. No. 4,013,905 to Breneman et al.; U.S. Pat. No. 4,176,,543 to Nolte et al.; U.S. Pat. No. 4,201,092 to Dau; U.S. Pat. No. 4,410,484 to Marini et al.; and U.S. Pat. No. 4,571,994 to Dickey et al.

The following technical references are also pertinent:

Eisenblatter, J. and Jax, P. "Acoustic Emission Analysis as a Means of Locating Defects and Finding Leaks in Large vessels and Pipework," *VGB Kraftwerkstechnick*, Vol. 56, No. 7, p. 414–417, July 1976;

Smith, J. R., Rao, D. M., Wassel, W. W. "Advances in Acoustic Leak Monitoring Instrumentation," *IEEE Trans. on Nucl. Sci.*, Vol. NS-30, No. 1. p. 825–832, Feb. 1983; and Jax, P. "Flaw Detection and Leak Testing in Components during Internal Pressure Loading with the Help of Acoustic Emission Analysis," *Proc. Acoustic Emission Conf.*, Bad Neuheim, W. Germany, p. 355–383, Apr. 1979.

Despite the presence of various known methods and devices for measuring and evaluating acoustic emissions, and the known applicability of such emissions to detecting the presence of and location for fluid leaks, these are generally either overly complicated or lack accuracy.

In *Non-Destructive Testing Handbook*, 2nd Ed., published by American Society of Non-Destructive Testing, 1987, at pages 137–144, it is emphasized that when dealing with continuous acoustic sources such as leaks, traditional acoustic emission parameters such as count, count rate, amplitude distribution and conventional delta t measurements, become meaningless and are rarely used. Conventional techniques for measuring time differences between two bursts of acoustic waves cannot be used for continuous sources such as leaks. The conventional and simple measurement of the difference in arrival time between bursts of acoustic emission at two spaced apart sensors is thus not clearly applicable when trying to measure continuous sources of acoustic emission.

While the publication does discuss the use of correlation techniques where two complicated noisy signals are compared to each other to determine their correlation, and thus the time delay between their occurrences, this involves complex computer processing and analysis.

SUMMARY OF THE INVENTION

The present invention begins with the realization that even continuous acoustic emissions, such as those from a fluid leak, contain spikes which may be utilized to advantage. The present invention employs a floating threshold capability with modern acoustic emission equipment. It detects spikes in the acoustic emission and treats them as "burst" emissions. In a floating threshold configuration, the value assigned to the detection threshold level is added to the average signal level. The threshold floats with the signal level. Proper adjustment of the floating threshold value enables transient spikes to be distinguished from the continuous noise and treated as burst emissions resulting in source location of the leak.

The system configuration of the present invention employs piezoelectric transducers acoustically coupled to a work piece. As a pressurized leak sends off signals in the component, the turbulence associated with the leak generates sound waves which propagate along the component surface. These sound waves are detected by the piezoelectric transducers. The electrical signals produced are proportional to the mechanical waves and amplified prior to being input into the acoustic emissions source location system. The floating threshold capability enables transient spikes to be detected and treated as burst emissions. The differences in arrival times of these spikes between the sensors are used to calculate source locations which can be displayed as a cumulative event location distribution plot.

Accordingly, an object of the present invention is to provide a new method of locating a leak which produces a continuous acoustic emission having background noise and spikes therein, comprising continuously monitoring acoustic emissions in real time from at least two spaced locations using detectors at the space locations, to form at least two continuous signals having background noise and spikes corresponding to the background noise and spikes of the acoustic emissions, the spikes in the signals being spaced from each other in time by an amount corresponding to the difference in travel time for an acoustic emission to each of the spaced detectors, adjusting a detection threshold value for each detector to remove the background noise from the spikes for each signal, and measuring the time difference between the spikes in the signals of the detectors, in real time, to determine the relative position of the acoustic emissions with respect to the detectors.

A further object of the invention is to provide an apparatus for locating a leak which includes spaced apart detectors for detecting acoustic emissions, means for adjusting the detection threshold value for the detectors so that background noise is removed from signals produced by the acoustic emissions to leave spikes and measuring the difference in time between spikes in the signals from the detectors which can be utilized to determine the relative position of the acoustic emission with respect to the detectors.

Another object of the present invention is to provide an apparatus and method for detecting leaks which is simple in design and rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
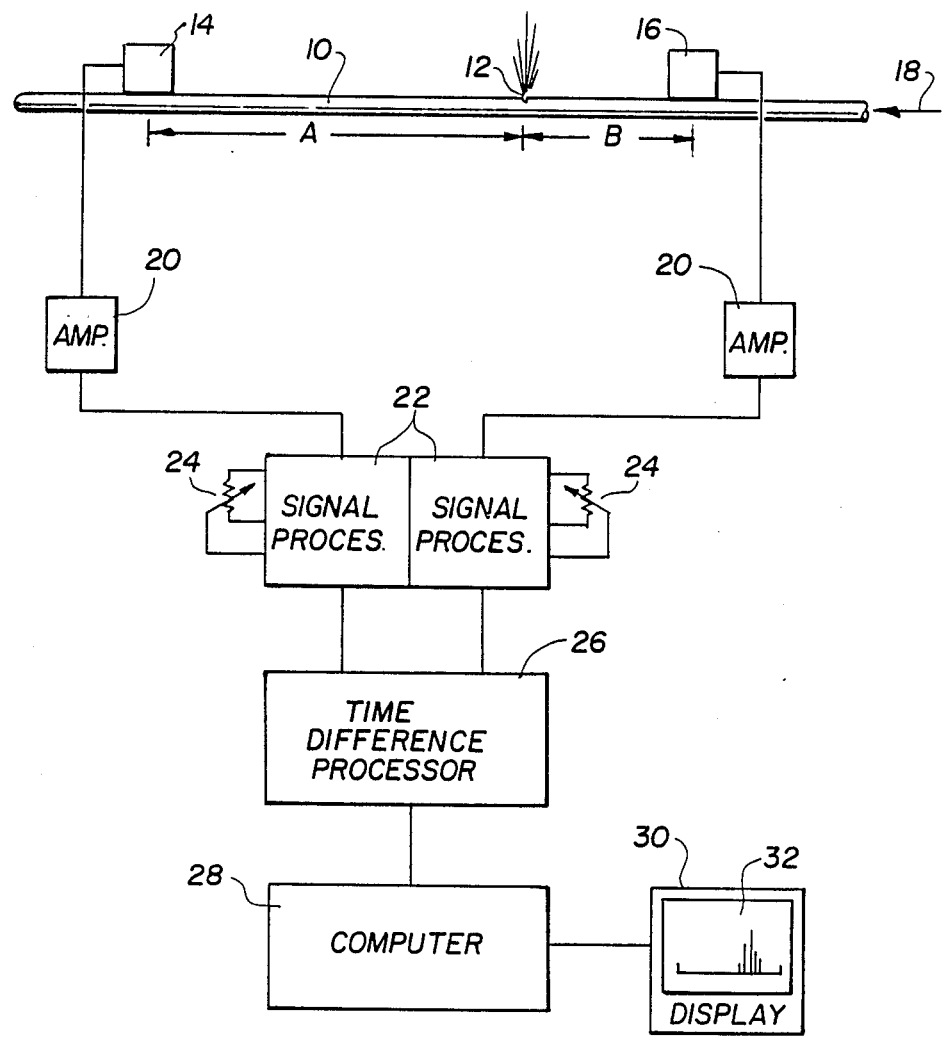
FIG. 1 is a schematic illustration of an apparatus used to practice the present invention.

Referring to the drawings in particular, the invention embodied in FIG. 1 comprises an apparatus for detecting the location of a leak 12 in a medium 10 such as a steam, gas or liquid pipe line.

The apparatus includes a pair of spaced apart piezoelectric transducers 14 and 16 which are mechanically coupled to the surface of pipeline 10. Experiments which were conducted to demonstrate the feasibility of the present invention, utilized transducers manufactured by Dunegan Corporation and identified as Model S9204.

The transducers or detectors 14 ad 16 are respectively connected to amplifiers 20 (for example Dunegan Corporation Model 1801 preamplifiers).

A primary object of the present invention is to locate the position of leak 12 by calculating the distances A and B, between the leak and respective detectors 14 and 16.

It has been found that despite the substantially continuous nature of the acoustic emissions from a fluid leak, random and distinct peaks exist in the emission above a threshold or background noise level.

Figure 2:
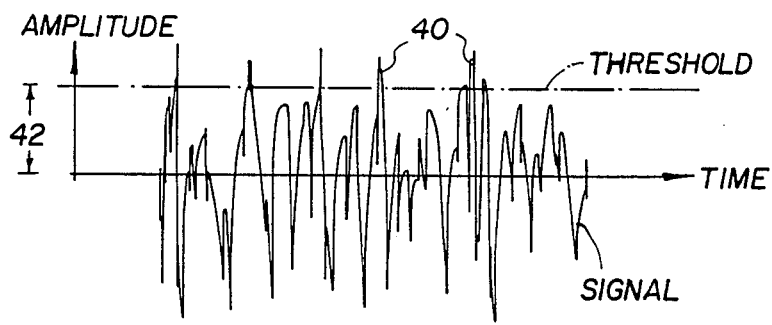
FIG. 2 is an illustration of a continuous acoustic signal having background noise and peaks such as the signal that would be characteristic of a fluid leak.

FIG. 2 shows a signal which would be produced by the detectors 14 and 16 and amplified by the amplifiers 20. The signals includes spikes 40 at locations along the signal, above a threshold level 42 shown in FIG. 2. Background noise below level 42 can be eliminated to reveal the spikes.

According to the present invention, the signal from each amplifier 20 is supplied to a signal processor 22 which has a floating threshold capability. The value of the floating threshold, at any given time, is the result of the average signal level at that time summed with an additive quantity which can be set by gain adjusters schematically shown at 24. The signal processors are part of a commercially available locating system available from Dunegan Corporation and designated as Model 1032D. The Model 1032D also includes a difference processor 26 which can be used to find the time difference between signals coming from the signal processors 22. This time difference is supplied to a computer 28 which can drive a display 30 e.g. a video CRT screen.

While only two detectors are shown in FIG. 1, any number of detectors can be utilized along a pipe to form a liner source location array. Alternatively, detectors can be distributed within a volume to locate, by triangulation, an audible emission in that volume.

The threshold detection level can be set either manually to ignore all but the spikes in the signal, or automatically in a floating manner. With a floating threshold value, the threshold value for example can be set at the level for the average signal amplitude. This wold automatically remove much of the background noise, substantially leaving only the spikes of the signal.

In either case, the peaks or spikes are processed in the time difference processor 26 to determine the time difference between corresponding peaks of the two measured signals, where time difference corresponds to the difference in distance between the two detectors and the leak.

Figure 3:
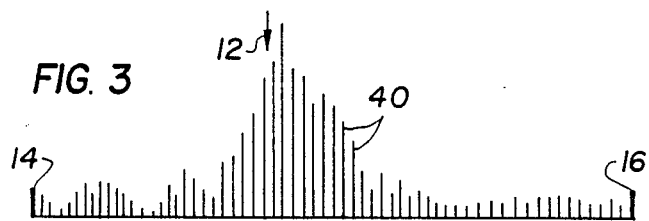
FIG. 3 is a graph showing a cumulative event location distribution plot for an air-to-water steady state test conducted in accordance with the present invention.
Figure 4:
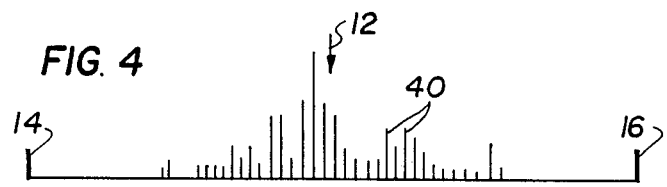
FIG. 4 is a graph similar to FIG. 3 for a nitrogen-to-water steady state test at 200 psi.
Figure 5:
FIG. 5 is a graph similar to FIG. 4 for a nitrogen-to-water steady state test at 300 psi.

FIG. 3, 4 and 5 are schematic illustrations showing representative displays that would be visible on screen 32 of display 30 shown in FIG. 1.

FIG. 3 shows the results of an actual experiment which utilized a pipeline or conduit 10 having a 3/8" OD and a leak or aperture 12 of 0.012".

Air submersion was supplied through inlet 18 of the pipeline, following its submersion in water, to produce an air-to-water leak at aperture 12. It was also found that if the aperture 12 was jagged, rather than smooth, this promoted turbulence which increased the presence of peaks or spikes. A smooth orifice had produced poorer results which was attributed to the lack of turbulence and thus the lack of peaks in the signal.

FIG. 3 shows good source location capacities. A promising Gaussian distribution curve with its peaks centered near the center of the linear array is shown. This in fact corresponded to the actual position of the orifice 12 along the conduit or pipeline used in the test.

FIG. 4 shows the results of a similar test, this time using a nitrogen-to-water mixture for the leak, at 200 psi. Again a good clustering of peaks is present near the actual location of the orifice, that is the acoustic emission.

FIG. 5 shows the same test as FIG. 4 at 300 psi. This demonstrated that an increase in pressure is not necessarily needed to improve accuracy.

Additional tests were also conducted to determine the usefulness of the present invention for different mixtures of fluids.

The results demonstrate the usefulness of the invention and the fact that a relatively simple floating threshold technique can be used rather than the far more complex cross correlation techniques, to accurately measure the location of leaks which produce continuous audible emissions.

While a specific embodiment of the invention has been showed and described in detail to illustrate the application of the principles of the invention, it will be understood that the invention may be embodied otherwise without departing from such principles.

What is claimed is:

1. A method of locating a leak which produces a continuous acoustic emission having background noise and spikes, comprising:
    continuously monitoring acoustic emissions from at least two spaced locations using detectors at the spaced locations to form at least two continuous signals having background noise and spikes corresponding to the background noise and spikes of the acoustic emission, the spikes in the signals of the detectors being offset from each other in time by an amount corresponding to the difference in travel time for an acoustic emission to each of the spaced locations;
    adjusting a detection threshold value for each detector to remove the background noise from the spikes in each signal, the detection threshold value being adjusted in a floating manner so as to correspond to an average level for the signals; and
    measuring the offset in time between the spikes of the signals, in real time, to determine the relative position of the acoustic emissions with respect to the spaced locations.

2. A method according to claim 1 wherein the location of the leak along a linear conduit is to be measured, the method including mechanically attaching each detector to the conduit at spaced locations along the conduit.

3. An apparatus for locating a leak which produces a continuous acoustic emission having background noise and spikes, comprising:
    at least two spaced apart acoustic emission detectors each for receiving acoustic emissions from a leak, each detector forming a signal having background noise and spikes corresponding to the background noise and spikes of the acoustic emission, the spikes being offset in time by an amount corresponding to the difference in travel time for the acoustic transmission to each of the detectors;
    signal processing means connected to each detector for applying a floating adjustable detection threshold value to each signal for eliminating the background noise from each signal, said signal processing means adjusting the detection threshold value to match a floating average level value for each signal; and
    computing means for computing the offset between spikes in the signals, in real time, for determining the relative position of the acoustic emission with respect to the detectors.

4. An apparatus according to claim 3 including, in combination, a conduit for receiving fluid which may leak through the conduit, said detectors being mechanically coupled with the conduit at spaced locations along the length of the conduit.

5. A method of locating a leak which produces a continuous acoustic emission having background noise and spikes, comprising:
    continuously monitoring acoustic emissions from at least two spaced locations using detectors at the spaced locations to form at least two continuous signals having background noise and spikes corresponding to the background noise and spikes of the acoustic emission, the spikes in the signals of the detectors being offset from each other in time by an amount corresponding to the difference in travel time for an acoustic emission to each of the spaced locations;
    adjusting a detection threshold value for each detector to remove the background noise from the spikes in each signal, the detection threshold being adjusted to equal a momentary average value for the signals; and
    measuring the offset in time between the spikes of the signals, in real time, to determine the relative position of the acoustic emissions with respect to the spaced locations.

* * * * *